United States Patent
Kaplan

[11] 3,726,174
[45] Apr. 10, 1973

[54] METHOD AND APPARATUS FOR THE INSTRUCTION OF FINGER SPACING IN PLAYING STRINGED INSTRUMENTS

[76] Inventor: Burton Kaplan, 817 West End Avenue, New York, N.Y. 10025

[22] Filed: Nov. 3, 1971

[21] Appl. No.: 195,307

[52] U.S. Cl..................................84/470, 84/465
[51] Int. Cl..............................................G09b 15/06
[58] Field of Search..............................84/281–283, 328, 453, 465, 467–470, 477; 200/DIG. 2, 61.47

[56] References Cited

UNITED STATES PATENTS

| | | |
|---|---|---|
| 1,015,715 | 1/1912 | Schindler..........................200/DIG. 2 |
| 1,343,595 | 6/1920 | Tiffany..................................84/469 |

FOREIGN PATENTS OR APPLICATIONS

| | | |
|---|---|---|
| 101,141 | 1/1899 | Germany..............................84/465 |

Primary Examiner—Richard B. Wilkinson
Assistant Examiner—John F. Gonzales
Attorney—Elmer R. Helferich et al.

[57] ABSTRACT

A finger spacing sensor is disposed between the thumb and forefinger of the student's hand and an indicator responsive to the sensor provides indication to the student of each departure of his thumb and forefinger from desired spacing during play.

13 Claims, 6 Drawing Figures

PATENTED APR 10 1973　　　　　　　3,726,174

METHOD AND APPARATUS FOR THE INSTRUCTION OF FINGER SPACING IN PLAYING STRINGED INSTRUMENTS

FIELD OF THE INVENTION

This invention pertains to music education and more particularly to methods and apparatus for instructing students in the art of playing stringed instruments.

BACKGROUND OF THE INVENTION

Violin teachers are in general agreement as to certain basic student-instrument interrelationships, e.g., the proper positioning of the violin during play. Thus, all typically instruct that the instrument be held in substantially horizontal position by the collar-bone and jawbone with some assist from the shoulder and string-fingering hand, the top of the violin being inclined slightly so as to face the listener. The neck of the instrument is disposed between the proximal phalanx of the forefinger and the thumb of the string-fingering hand. Ideally, the undersurface of the neck of the instrument is spaced from the crotch of the forefinger and thumb and these fingers are spaced from one another such that they exert minimal pressure on the side surfaces of the neck of the instrument. So arranged, the hand is relaxed and the student has greatest capability for fingering the strings of the instrument.

Finger spacing considerations arise also in respect of holding the bow. The bow is held by placing the tip of the thumb of the bowing hand against the bow stick in the vicinity of the nut and by placing the middle finger against the stick opposite the thumb. The remaining fingers are disposed aside the middle finger. Ideally, the hand is rounded with the thumb and other fingers curved to maintain the distal and promimal phalanxes of the thumb spaced from the opposed fingers. So arranged, the bowing hand is relaxed and the student has greatest capability for accomplishing bow movements requiring hand flexibility, for example, in spiccato bowing and the like.

While the student, whether beginning or remedial, readily spaces his fingers initially in such desired manner, he characteristically permits his fingers to depart from desired spacing during playing. By the term playing, I include private practice, concert, rehearsal or practice at a lesson.

Oral instructional efforts customarily undertaken to influence the student in the continuation of such proper spacing of his fingers in his playing of the instrument are less effective than is desired, and are effective to such extent only during practice at a lesson. Whereas deficiencies in tonal reproduction and intonation may indicate improper finger spacing to the skilled artist, such deficiencies do not so inform the beginning student and, accordingly, are not a source of corrective influence.

Violin instructional devices in the nature of harnesses effective to constrain a student to desired positions as shown, e.g., in U.S. Pat. No. 1,906,584 and No. 2,240,696, are not seen as providing any such corrective influence. These devices are effectively crutches providing unnatural assistance not likely to continue their limited effectiveness when dispensed with. Furthermore, during use thereof, these devices prevent experimentation by the student, thereby eliminating the possibility of error on his part. Evidently, these devices cannot assist the student in developing a sense of guidance independent of the devices.

SUMMARY OF THE INVENTION

I have observed that the attention of the stringed instrument student is diluted by the variables he is required to control to such an extent that the attention he in fact directs to any particular variable, e.g., finger-thumb spacing, is inadequate. He thus does not generate requisite self-corrective influence. Accordingly, I have concluded that instructional method and apparatus likely to provide improved corrective influence must have the effect of focusing the attention of the student on distinct variables and develop in him an independent sense of guidance. Such method and apparatus are the primary objects of this invention.

It is an additional object of this invention to provide instructional method and apparatus for use in private practice independently of an instructor.

A further object of the invention is to provide instructional apparatus which interferes minimally with the freedom of movement of the student.

In the attainment of the foregoing and other objects, the invention provides apparatus, including finger spacing-sensitive signal generating means supportable by the forefinger and thumb of the hand employed in string-fingering or bowing and effective on predetermined deviation from proper finger spacing to direct the student's attention to the matter of finger spacing. In accordance with the method of the invention, such apparatus is provided and positioned in the student's hand.

The foregoing and other objects and features of the invention will be evident from the following detailed description thereof and from the drawings.

DETAILED DESCRIPTION OF THE PREFERRED EMBODIMENTS

Figure 1:
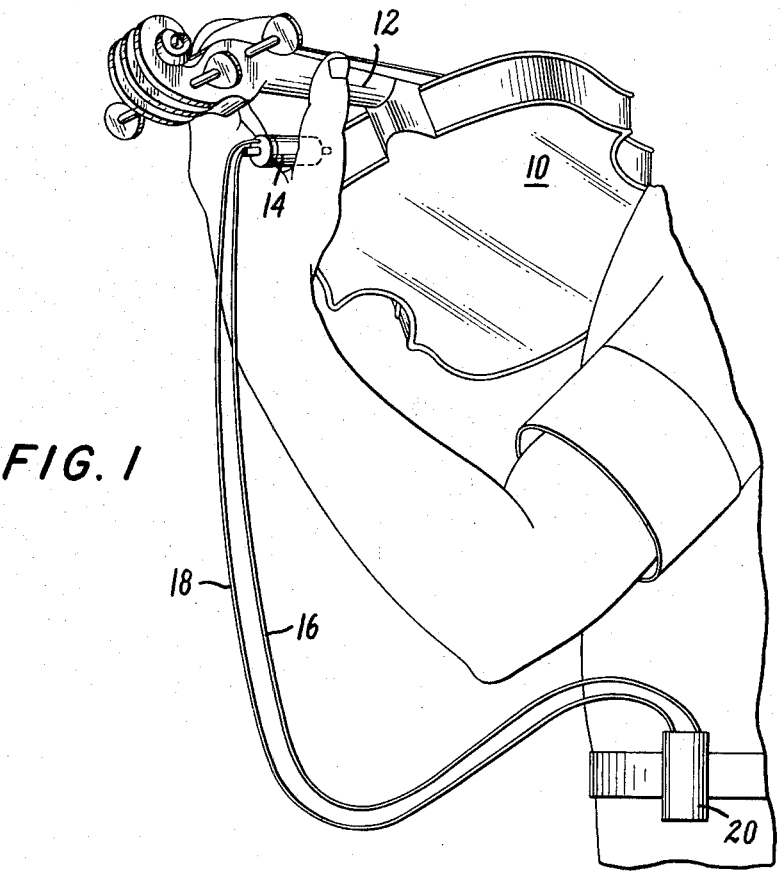
FIG. 1 is a perspective view illustrative of the method and apparatus of the invention as applied to providing indication of improper spacing of the thumb and forefinger of the string-fingering hand of a student.

In FIG. 1, violin 10 is held in proper position with the thumb and forefinger of the student's left hand in cooperative association with neck 12 as above discussed. In the crotch formed between his thumb and his forefinger is positioned a generally cylindrical elongate device 14. Insulated conductors 16 and 18 extend from device 14 to a remotely disposed assembly 20 which may conveniently be secured to the student's belt. In such arrangement, conductors 16 and 18 are of sufficient length so as not to interfere with movement of the arm of the student.

Device 14 and alternative apparatus of the invention discussed in detail below are operative on undesired spacing between the forefinger and the thumb to provide an output on conductors 16 and 18. Assembly 20 is responsive to such output on conductors 16 and 18 to provide an indication of undesired finger spacing to the student, e.g., by generating a sustained audible output.

Figures 2, 3:
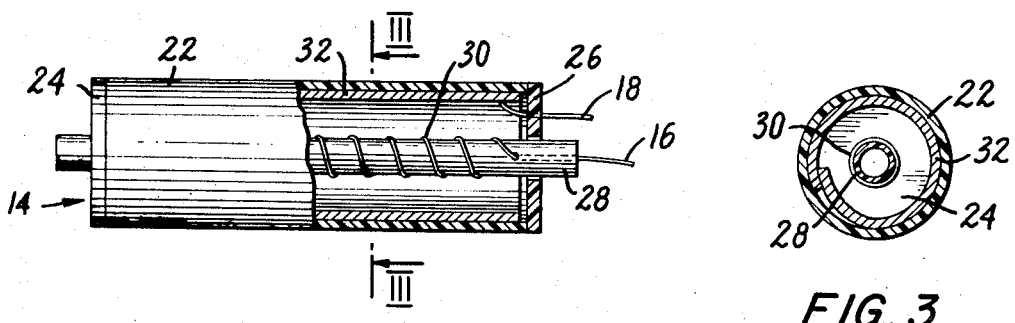
FIG. 2 is an elevational view of apparatus for use in FIG. 1, partly broken away to show detail.
FIG. 3 is a sectional view of the apparatus of FIG. 2 taken along the line III—III.

Referring to FIG. 2, a generally cylindrical sleeve 22 is secured to facing discs 24 and 26, the sleeve being comprised of a flexible material adapted to deform in response to undesired finger spacing. The sleeve may alternatively be comprised of rigid material throughout the end portions thereof with the central expanse being comprised of such flexible material. In a particularly preferred construction, the sleeve is flexible throughout its expanse and is comprised of a rubber-like or pliable synthetic material.

Discs 24 and 26 define central apertures and thereby support a tubular member 28. Conductor 16 extends interiorly of member 28 and is therein connected to a conductor 30. Conductor 30 extends through the sidewall of member 28 and is wound sinuously about the exterior surface thereof. In this instance, tubular member 28 may be comprised of lightweight synthetic material. Alternatively, it may be comprised of a lightweight metal, e.g., aluminum, in which case conductor 16 may be connected thereto and conductor 30 may be omitted. Where sleeve 22 is not itself conductive, and as best seen in FIG. 3, a sheet 32, preferably of metallic foil, is disposed interiorly of sleeve 22 along the lineal expanse thereof. While sheet 32 may be secured to sleeve 22, it is preferably not secured thereto and maintains its position, spaced from and encircling conductor 30, as illustrated in FIG. 3, by reason of a natural tendency thereof to uncurl. Conductor 18 is connected to sheet 32 as shown in FIG. 2 and extends through a further aperture in disc 26. Where sleeve 22 is conductive, conductor 18 is connected to the sleeve and sheet 32 may be omitted.

In the apparatus of FIGS. 2 and 3, electrical continuity between conductors 16 and 18 occurs exclusively on deformation of sleeve 22 sufficiently to bring conductor 30 and sheet 32 into contact. The deformation required for such contact may evidently be varied, e.g., by altering the diameter of member 28 or the diameter of sleeve 22. Thus, the apparatus may readily accommodate diversity in student hand size and diversity in finger spacing desired, which varies from teacher to teacher.

Figure 4:
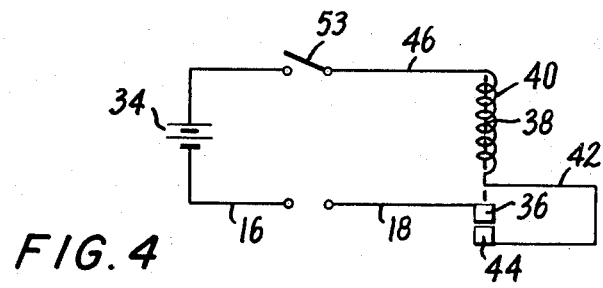
FIG. 4 is a schematic diagram of a circuit which may be employed in association with the apparatus of FIG. 2.

Conductors 16 and 18 are connected respectively, as shown in FIG. 4, to one terminal of a battery 34 and to a contact member 36.

Contact member 36 is resiliently supported in assembly 20 for movement by the armature 38 of coil 40. One terminal of the coil is connected by line 42 to contact member 44, fixedly supported in assembly 20 in position engaging contact member 36 when coil 40 is unenergized. The remaining terminal of the coil is connected by line 46 to the remaining terminal of battery 34. The circuit of FIG. 4 will be recognized as a conventional buzzer type annunciator. In operation thereof, when electrical continuity is provided between conductors 16 and 18 by sheet 32 and conductor 30 of FIG. 2, coil 40 is energized by battery 34 and thereupon displaces armature 38 such that contact member 36 is removed from contact member 44 with consequent deenergization of the coil. As the contact members are thereupon re-engaged, the coil is re-energized. This activity is cyclic throughout periods of continuity between conductors 16 and 18 and gives rise to sustained audible output. Where desired, a switch 53 may be introduced in the circuit of FIG. 4 so as to provide for the disabling of the buzzer at the option of the student or teacher. Assembly 20 may contain such switch and provide a convenient exterior actuator therefor.

The accessory apparatus of FIGS. 2 and 3 is of particularly light weight, involving conductive members in the form of foil and thin wire and synthetic support members therefor. This feature is of evident advantage in avoiding the introduction in the student's hand of a device which is heavy or cumbersome and it has been observed that the student readily accommodates the apparatus. Sleeve 22 preferably defines a non-slip surface adapted to maintain the apparatus in frictional engagement with the student's hand.

The methods of the invention, whereby the attention priorities of the student are conformed to the interests of the teacher, involve the steps of providing the accessory apparatus and disposing the spacing-sensitive means thereof in the crotch between the forefinger and thumb of the string-fingering hand of the student. Preferably, the method is practiced by determining a range of proper thumb-forefinger spacing for a given student, providing accessory apparatus adapted to provide an indication on spacing outside such range and disposing the spacing-sensitive means thereof in the thumb-forefinger crotch. As discussed above, such spacing range is limited and device 14 dimensions may be varied to accommodate any desired range.

In the use of the apparatus and method of the invention, it has also been observed that the average student is instructed as respects his proper finger spacing in relatively short order and thereafter plays without energizing the accessory apparatus, despite that the same is active and prepared to provide indications of deviation from proper finger spacing. It has been observed further that on the removal of the accessory apparatus after limited use thereof, the student exhibits a mature habit of consistently maintaining proper finger spacing, evidence of his development of an independent sense of guidance.

Figure 5:
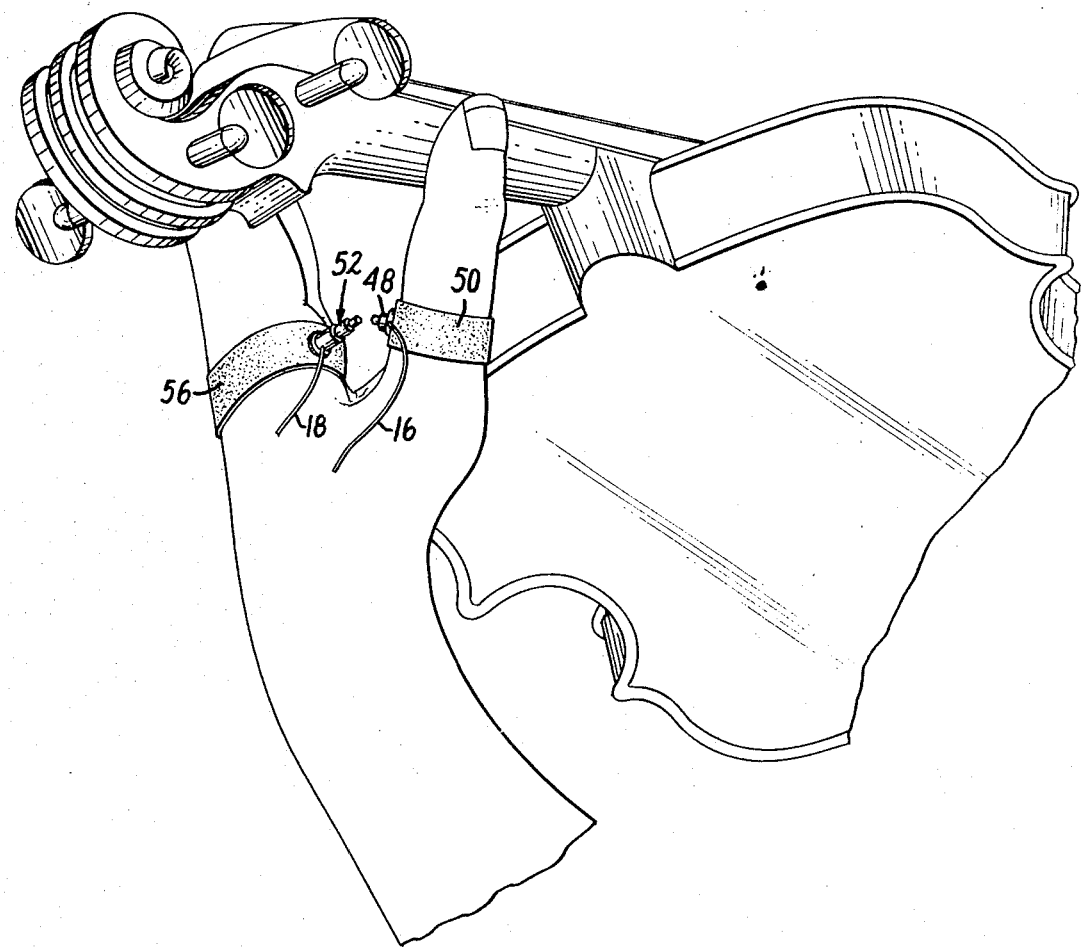
FIGS. 5 and 6 illustrate a further embodiment of apparatus for use in practicing the invention.
Figure 6:
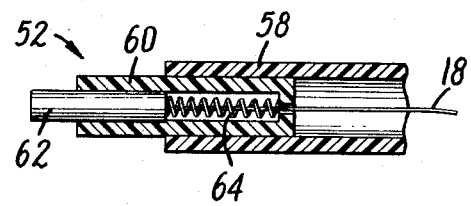

Referring to FIG. 5, a first contact member 48, connected to conductor 16, is secured to the thumb of the string-fingering hand by band 50 and a contact assembly 52 is secured to this hand below the forefinger by strap 56. As shown in FIG. 6, the contact assembly includes telescopic members 58 and 60 and a second contact member 62, connected to conductor 18, is seated in member 60 and extends therefrom under the influence of spring 64. The positioning of contact member 62 relative to the forefinger may be varied by telescoping members 58 and 60, which are in nominal frictional sliding engagement. Accordingly, any desired spacing may be provided as between contact members 48 and 62. As discussed in connection with finger spacing-sensitive device 14, in the arrangement of FIGS. 5 and 6, an output, indicative of undesired finger spacing, is provided on conductors 16 and 18 on the engagement of contact members 48 and 62.

The devices of FIGS. 1-3 and 5-6 are both adapted to provide substantially no resistance to operation thereof. Thus, sleeve 22 is flexible and is readily squeezed or deformed and spring 64 is selected to provide for ready displacement of contact member 62 into telescopic member 60. By this provision, physical sensation as between the finger spacing-sensitive means and the student's hand is minimized and the student's attention is focused by the indication provided by the accessory apparatus.

To this juncture, discussion has been directed to the method and apparatus of the invention as applied to instruction in properly spacing fingers of the string-fingering hand. Such discussion applies equally to instruction in properly spacing fingers of the bowing hand. Thus, the apparatus of FIG. 1 may be positioned in the space intermediate the thumb and fingers of the bowing hand, or more particularly, in the crotch between the thumb and forefinger thereof. Upon each undesired spacing between the thumb and fingers, e.g., upon arching of the thumb inwardly toward the opposed fingers, indication of improper finger spacing is provided. The alternate illustrated apparatus may be secured to the thumb and to a finger of the bowing hand with like result.

While the apparatus and method of the invention have been described by way of particularly preferred embodiments thereof, numerous changes in the described apparatus will be readily evident to those skilled in the art. Thus, for example, piezoelectric or like annunciators may be employed in place of the illustrated electromechanical buzzer. Finger spacing-sensitive apparatus of a type different than that specifically shown may be employed, e.g., a pneumatically-actuated switch. It is within the contemplation of the invention to secure assembly 20 to the stringed instrument itself or to the forearm of the student. The embodiments particularly disclosed are thus intended in a descriptive and not in a limiting sense. The true spirit and scope of the invention is defined in the following claims.

What is claimed is:

1. Apparatus for use in instructing a student in properly spacing the thumb and a finger of his hand in playing a stringed instrument, comprising:
   a. means sensing spacing between said thumb and finger including a switch operable by said thumb and finger on predetermined spacing therebetween while the same are spacedly disposed sufficiently to opposingly engage the neck or bow of said instrument;
   b. a voltage source; and
   c. indicator means connected to said source by said switch, said indicator means being energized upon operation of said switch.

2. The apparatus claimed in claim 1 wherein said sensing means comprises a casing having a deformable expanse positionable between said thumb and finger, said switch being operable on predetermined deformation of said casing by said thumb and finger.

3. The apparatus claimed in claim 2 wherein said switch comprises a first contact member fixedly supported in said casing and a second contact member movable on deformation of said casing.

4. The apparatus claimed in claim 1 wherein said switch comprises first and second contact members, said sensing means including independent and unconnected support means for each said contact member, said second contact member being resiliently supported by its said support means.

5. The apparatus claimed in claim 4 wherein said second contact member support means includes means variably positioning said second contact member.

6. The apparatus claimed in claim 1 wherein said indicator means comprises an electromechanical buzzer.

7. The apparatus claimed in claim 2 wherein said casing defines an exterior surface for frictionally engaging the skin of the student.

8. A method for teaching a student of a stringed instrument to maintain proper spacing between the thumb and finger of his hand during the playing of the instrument including the step of equipping the student with apparatus providing him with an audible or visual indication upon each occurrence of his spacing of said thumb and finger in a spacing having predetermined relation to said proper spacing.

9. The method claimed in claim 8 wherein said apparatus includes finger spacing-sensitive means and wherein said equipping step is practiced by disposing said finger spacing-sensitive means between said thumb and finger.

10. The method claimed in claim 8 wherein said equipping step is practiced by using apparatus providing an audible indication on each said occurrence.

11. A method for teaching a student of a stringed instrument to maintain proper spacing between the thumb and finger of his hand, comprising the steps of:
   a. determining the range of proper thumb-finger spacing for the student;
   b. providing an assembly including a voltage source, indicator means and means connected to said source and to said indicator means for detecting spacing having predetermined relation to said proper spacing range and thereupon connecting said indicator means to said voltage source; and
   c. securing said assembly to the body of the student.

12. The method claimed in claim 10 wherein said detecting means is disposed in the crotch between the thumb and forefinger of the hand of the student employed in fingering the strings of the instrument.

13. The method claimed in claim 10 wherein said detecting means is disposed in the crotch between the thumb and forefinger of the hand of the student employed in bowing.

* * * * *